July 8, 1941.  J. O. HALLMAN, SR  2,248,867
DEVICE FOR LIQUEFYING HONEY
Filed June 27, 1940  2 Sheets-Sheet 1
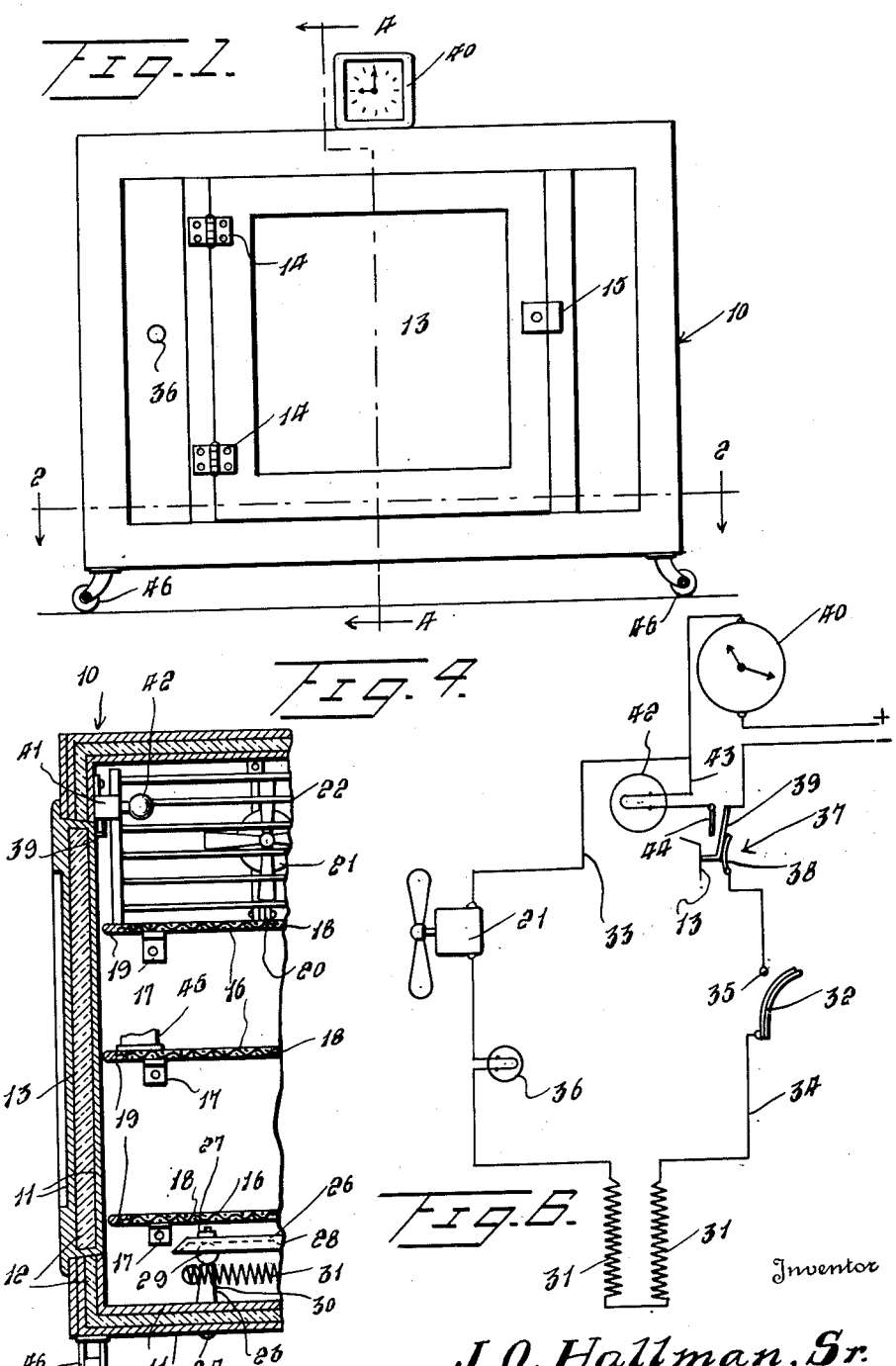
Inventor
J. O. Hallman, Sr.
By L. F. Randolph
Attorney July 8, 1941.  J. O. HALLMAN, SR  2,248,867
DEVICE FOR LIQUEFYING HONEY
Filed June 27, 1940   2 Sheets-Sheet 2
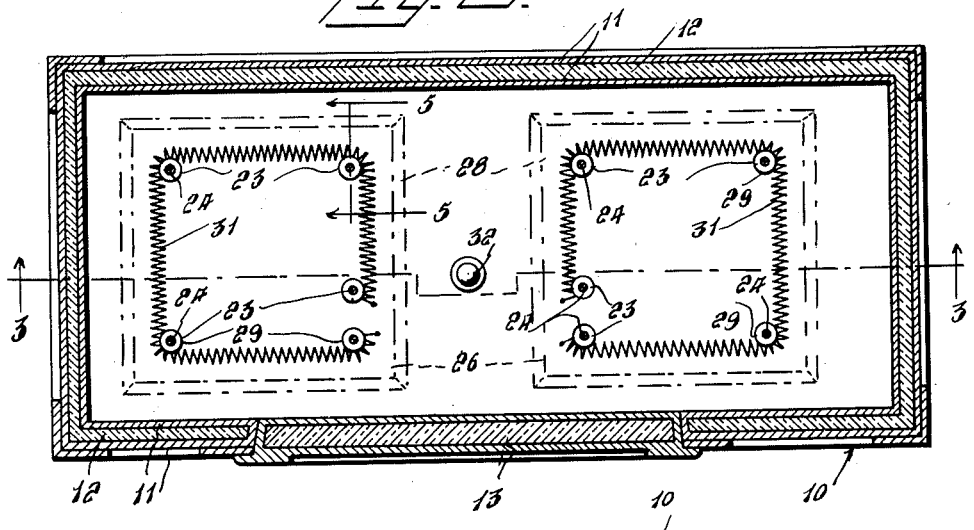
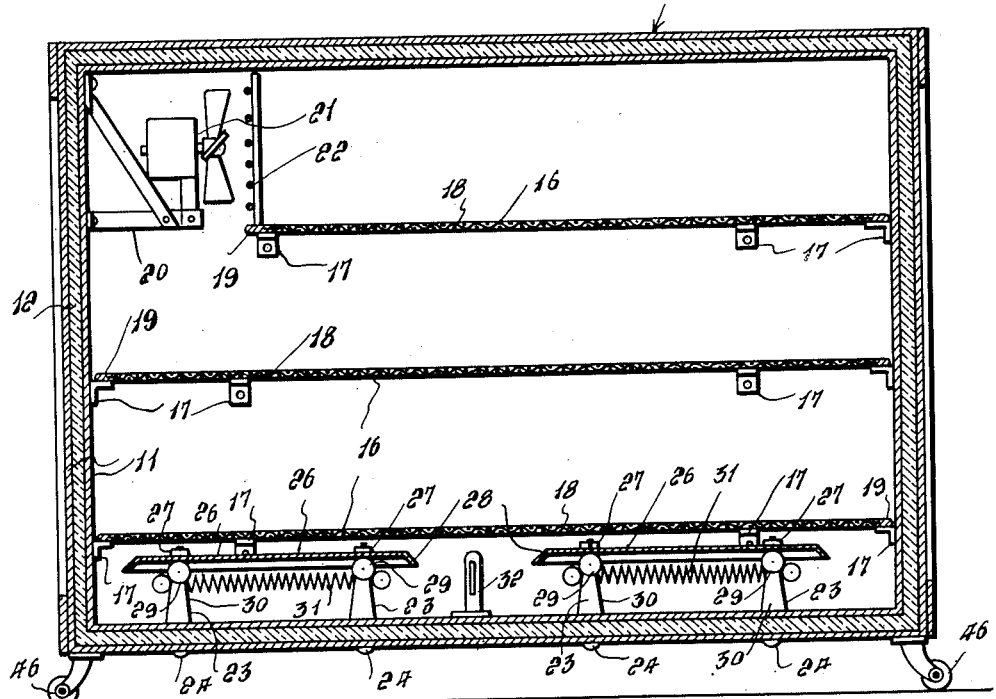
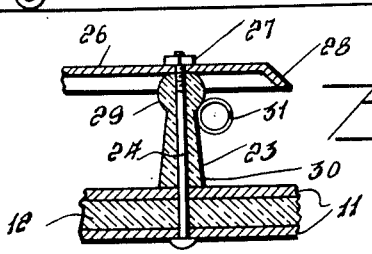
Inventor
J. O. Hallman, Sr.
By L. F. Randolph
Attorney Patented July 8, 1941

2,248,867

UNITED STATES PATENT OFFICE 2,248,867

DEVICE FOR LIQUEFYING HONEY

Julian O. Hallman, Sr., Blackshear, Ga.

Application June 27, 1940, Serial No. 342,790

2 Claims. (Cl. 219—35)

This invention relates to a novel device for liquefying comb honey which has become crystallized or granulated and particularly aims to provide a device having thermostatically controlled means for heating the interior of a container and circulating the air therethrough for maintaining a substantialy uniform temperature therewithin sufficiently high for liquefying crystallized honey and sufficiently low that wax from the honeycombs will not be melted.

Bulk comb honey is commonly packed in tin pails, glass jars and the like and if stored in a cold place the honey will crystallize. Where this occurs it has been the common practice to melt the combs and honey and then separate the wax from the honey and sell the strained honey as an inferior extracted honey. This invention provides an automatic device by means of which granulated bulk comb honey can be liquefied without melting or injuring the wax comb and without affecting the original color or flavor of the honey, as the low temperatures which cause the crystallization of the honey do not affect its flavor or color. This result is accomplished due to the fact that honey will melt at a temperature of substantially 110 degrees Fahrenheit while the honeycombs will melt at 143 degrees Fahrenheit and soften and lose its form at substantially 125 degrees Fahrenheit, so that by maintaining the honey in a temperature between 110 and 120 degrees Fahrenheit the honey can be liquefied without affecting the honeycomb.

It is therefore a primary aim of the invention to provide automatically controlled electrically energized heating means for maintaining a temperature within the container between 110 and 120 degrees Fahrenheit and means for obtaining a circulation of the air through and around the honey to insure a substantial uniformity of temperature, and to provide means connected in circuit with said electrical heating and air circulating means for automatically breaking the electric circuit to said elements after a given period required to accomplish the above described result.

Other objects and advantages of the invention will hereinafter become more fully apparent from the following description of the drawings, which illustrate a preferred embodiment thereof, and wherein;

Figure 1 is a front elevational view of the device,

Figure 2 is horizontal sectional view taken substantially along the plane of the line 2—2 of Figure 1, Figure 3 is a longitudinal vertical sectional view taken substantially along the plane of the line 3—3 of Figure 2, Figure 4 is a transverse vertical sectional view taken substantially along the plane of the line 4—4 of Figure 1, Figure 5 is an enlarged detail vertical sectional view taken substantially along the plane of the line 5—5 of Figure 2, and Figure 6 is a diagrammatic view of the electric circuit of the device.

Referring more particularly to the drawings, wherein like reference characters designate like or corresponding parts throughout the different views, 10 designates generally a container having a top, bottom and side walls each provided with an inner and outer ply of metal, designated 11, and having interposed therebetween a layer of porcelain 12 for insulating the interior of the container 10. The container 10 is provided with a door 13 in one side thereof which is similarly insulated, as best seen in Figure 2. The door 13 is supported along one side thereof by means of hinges 14 and on its opposite free edge is provided with a latch 15. The container 10 is provided with a plurality of shelves 16 which are supported therein in superimposed spaced apart relationship relatively to each other and to the bottom of the container by means of the brackets 17 which are attached to the inner side of the side walls of the container. Each of the shelves 16 is formed of mesh wire fabric 18 which is enclosed in a rigid frame 19.

The uppermost shelf 16 terminates short of one end of the container 10 to provide a space for a bracket 20 which is fastened to one of the side walls of the container 10 and which supports a conventional electric fan 21 which faces toward the opposite end of the container 10, as best seen in Figure 3. A cage 22 is disposed in front of the electric fan 21 and above the upper shelf 16. The bracket 20 is formed of metallic straps and includes a diagonal brace, as best seen in Figure 3, and is so constructed that it will not impede the circulation of air to the space behind the fan 21 so that when the fan is in operation the air will circulate freely through the container 10 and through its shelves 16 which are adapted to support jars or pails of bulk comb honey, not shown.

Between the lowermost shelf 16 and the bottom of the container 10 is disposed a plurality of porcelain insulators 23 which are arranged in sets of five insulators each. The insulators 23 of each of the sets are arranged to form substantially a square, as best seen in Figure 2, and are retained in position by means of bolts 24 which extend upwardly through the bottom of the container 10 and longitudinally through the insulators 23, as best seen in Figure 5. A metallic shield 26 is disposed over each of the sets of insulators 23 and is secured thereon by means of the bolts 24 which extend upwardly therethrough and which are provided on their upper, threaded ends with nuts 27 for detachably fastening the shields 26 to the insulators 23. The shields 26 are provided with outwardly and downwardly flared marginal flanges 28. Each of the insulators 23 includes a knob portion 29 at the upper end thereof and a tapered body portion 30 which tapers toward the knob portion 29. An electrical heating coil 31 is stretched around each of the sets of insulators 23 and disposed in the grooves thereof formed by junction of the body portions 30 and the knobs 29 thereof. As best seen in Figure 2, the ends of the electrical heating coils 31 are attached to the adjacent insulators 23 of each of said sets. A conventional thermostat 32 is mounted on the bottom of the container 10 and disposed between the heating elements 31.

As best seen in the diagrammatic view, Figure 6, the electric fan 21 and the heating coils 31 are connected in circuit with a conductor 33 which leads from a source of electric current, not shown, as for example a conventional electric outlet box, and which is provided with a return, ground wire or conductor 34. The thermostat 32 is connected in the circuit, as for example in the return wire 34 and is shown in an open position out of engagement with a contact point 35. A small lamp bulb 36, which is disposed in a recess in the outer side of the front wall of the container 10, is connected with the conductor wire 33 in circuit with the heating elements 31 and the fan 21. The lamp bulb 36 is preferably colored red and forms a pilot or telltale visual indicator to indicate when the heating elements and the fan are energized, as will hereinafter become apparent. A switch, designated generally 37, is provided in the ground wire 34 and includes a yieldable contact element 38 and a resilient contact member 39. The contact member 39 has its free end disposed to be engaged by a portion of the door 13, when in a closed position, and thereby hold the member 39 under tension and in engagement with the contact element 38 to complete the connection from the contact point 35 to the negative side of the source of electric current. A conventional time controlled master switch including a clock 40 is connected to the conductor 33 between the source of electric current and the fan 21. The clock 40, which is mounted on the top of the container 10, is adapted to be set, in a conventional manner, for interrupting the circuit, as disclosed in Figure 6, at a predetermined future time. A lamp socket 41 is mounted in the container 10 above and adjacent the door 13 and is provided with a lamp bulb 42, for illuminating the interior of the container 10, which is provided with a branch conductor 43 which extends from the conductor 33 through the lamp bulb 42 and which is provided at its free end with a contact element 44 which is positioned to be engaged by the resilient contact member 39, when said member is released by the opening of the door 13 and thereby permitted to swing outwardly.

From the foregoing it will be obvious that the container 10 can be filled with pails or jars of bulb comb honey which has become granulated or crystallized by being subjected to low temperatures. The master switch can be closed and set by the clock 40 for maintaining the temperature in the container 10 above 110 degrees Fahrenheit and less than 120 degrees Fahrenheit to liquefy the honey. With the master switch associated with clock 40 thus closed, and the door 13 in a closed position so that the contact members 38 and 39 of the switch 37 are in a closed position, when the temperature in the container 10 falls to 110 degrees Fahrenheit the thermostat 32 would be moved thereby to contact the contact point 35 to close the circuit and to thus energize the electric fan 21, the heating elements 31 and the pilot light 36. The heating elements 31 will heat the air in the lower portion of the container 10, which air will be circulated through the container by the electric fan 21 and through and around the shelves 16 to uniformly heat the pails or jars of honey supported thereby. When the temperature in the container 10 rises to approximately 120 degrees Fahrenheit the thermostat 32 will resume an open position, as illustrated in Figure 6 to break the circuit to the heating elements 31 and the fan 21. The shield 26 will prevent the honey disposed adjacent to the heating elements from being heated to too high a temperature and the heated shield will tend to maintain the temperature in the container when the heating elements 31 are deenergized. The pilot light 36 provides visual indicating means to show when the heating elements and electric fan are functioning. If the door 13 is opened while the heating elements and the fan are energized the resilient contact member 39 will move out of engagement with the contact element 38 and break the circuit to deenergize these parts so that the heat will not be wasted and the heated air will not be blown out of the container 10. Likewise, the opening of the door will cause the contact member 39 to contact the element 44 to energize the lamp bulb 42 to illuminate the interior of the container. The switch associated with the time control means 40 is adapted to be set so that after the honey has been subjected to the heat of the container 10 for a sufficient time to liquefy the honey this switch will automatically be opened by the clock to break the circuit to the fan and heating elements, thereby making it unnecessary to provide an attendant to see that the device is turned off after a sufficient time has elapsed to completely liquefy the honey.

The container 10 is preferably provided with a Fahrenheit thermometer 45 disposed therewithin and adjacent the door 13 by means of which the temperature within the container may be checked if desired. The container 10 is adapted to be mounted on casters 46.

Various modifications and changes are contemplated and may obviously be resorted to as only a preferred embodiment of the invention has been disclosed.

I claim as my invention:

1. A device for liquefying honey comprising an insulated casing, a plurality of shelves of open work material disposed in said casing in superimposed spaced apart relationship relatively to each other and to the bottom of the casing, means for heating said casing, means for creating a circulation of air in the casing, a thermostat for controlling said heating means and said air circulation means for maintaining a substantially uniform temperature in the casing, said casing being provided with a closure, said air circulating means and heating means being connected in a circuit through said thermostat to a source of electric current, and a switch associated with said closure for opening the circuit to said heating and air circulating means when the closure is moved to an open position.

2. A device for liquefying granulated or crystallized comb honey comprising an insulated container provided with a plurality of shelves for containing granulated comb honey to be liquefied, said shelves being of open work construction to permit passage of air therethrough, a heating element mounted in said container, an electric fan mounted in the container for circulating the air therethrough, said heating element and electric fan being connected in circuit to a source of electric current, a thermostat disposed in said container and connected to said circuit to energize and deenergize the heating element and electric fan, a time control switch connected to said circuit and adapted to be set to open the circuit at a predetermined time, said container being provided with a closure, and switch means actuated by said closure for opening the circuit to the heating element and electric fan when the closure is in an open position.

JULIAN O. HALLMAN, Sr.